Feb. 14, 1956   C. D. PETERSON   2,734,530
DIAPHRAGM HOUSING
Original Filed March 27, 1947
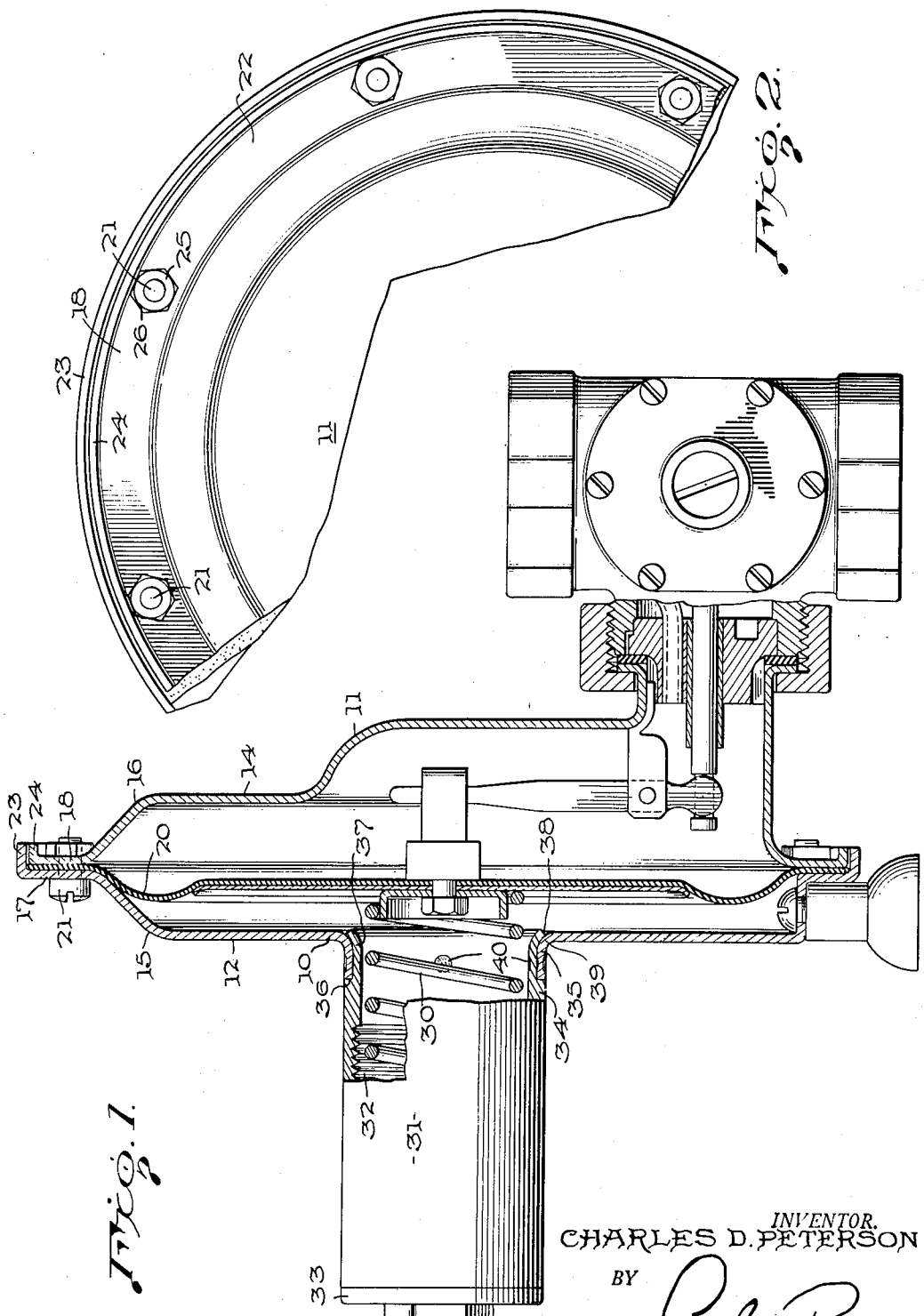

United States Patent Office 2,734,530
Patented Feb. 14, 1956

2,734,530
DIAPHRAGM HOUSING

Charles D. Peterson, Dallas, Tex., assignor to Universal Controls Corporation, Dallas, Tex., a corporation of Texas Original application March 27, 1947, Serial No. 737,656, now Patent No. 2,577,480, dated December 4, 1951. Divided and this application June 25, 1951, Serial No. 233,389

1 Claim. (Cl. 137—788)

This invention relates to housings for flexible diaphragms, and more particularly to such housings constructed of relatively thin pressed or stamped sheet metal.

It is a general object of the present invention to provide a novel and improved metal diaphragm housing.

More particularly it is an object of the invention to provide a pressed metal diaphragm housing composed of two complemental dished parts or shells, each fitted with a peripheral, radially disposed, plane border, the two border parts being arranged to clamp the edge of a diaphragm between them and each having a reinforcing cylindrical flange on its outer edge providing added stiffness against bending between the clamping bolts which secure the parts together and over the periphery of the diaphragm.

An important object of the invention consists in the provision of pressed sheet metal diaphragm housing parts having peripheral, diaphragm-engaging borders, wherein each border is reinforced with an integral cylindrical flange, said flanges being so directed that they loosely telescope, whereby one overhangs and protects the diaphragm edge from the weather.

Another important object of the invention consists in providing peripheral, diaphragm-engaging borders of sheet metal for diaphragm housing parts, which sheet metal is of insufficient rigidity between the clamping bolts to secure fluid tightness against the diaphragm and wherein these borders are fitted with narrow, integral, cylindrical flanges providing the necessary stiffness to insure proper diaphragm clamping under all conditions.

Another important object of the invention comprises the combination of a sheet metal diaphragm housing half and an axially disposed diaphragm-spring tube wherein the tube is of sufficient thickness to be internally threaded and has its inner end externally reduced in thickness for close telescoping fit in a short integral sput pressed from the material of the housing half, said inner telescoped part being flared against the radius at the junction of the sput and the diaphragm shell to interlock the parts.

Other and further objects of the invention will be more apparent to those skilled in the art upon a consideration of the accompanying drawing and following specification wherein is disclosed a single exemplary embodiment of the invention, with the understanding that such changes may be made therein as fall within the scope of the appended claims without departing from the spirit of the invention.

In said drawings:

Fig. 1 is a partial diametrical section through a pressed metal diaphragm housing and diaphragm spring tube constructed in accordance with the present invention; and Fig. 2 is a fragmental elevation of the back face of the telescoped shells which form the housing and showing the manner in which one of the cylindrical flange engages the nuts on the clamping bolts and holds them against rotation.

This application is a division of my copending application Serial No. 737,656, for Gas Service Pressure Regulators, filed March 27, 1947, now Patent No. 2,577,480, December 4, 1951, but claims only the structural features of the diaphragm housing.

Many types of apparatus for use with gases and liquids under relatively low pressures make use of flexible diaphragms, one side of which is subjected to a fluid at one pressure and the other side to atmosphere or a fluid at a different pressure. In order to support the diaphragm and to provide the chambers on the opposite sides thereof for the different-pressured fluids, some form of housing is required, and heretofore have been usually constructed as two part sand or die castings in order to obtain the necessary rigidity, particularly for clamping the periphery of the diaphragm and insuring fluid tightness.

In accordance with the present invention departure is made from this standard practice, which is costly in weight as well as in machine operations required, by using pressed sheet metal of relatively light gauge. The thickness of metal is exaggerated in the drawing for simplicity of disclosure.

Referring now to the drawing, the diaphragm housing will be seen to comprise a pair of housing shells or halves 10 and 11, each of generally dished form for strength and to provide room for movement of the diaphragm. The shells which may be variously shaped for functional reasons include a relatively flat bottom 12 and 14 and tapered areas 15 and 16 leading to the plane, radial borders 17 and 18 which are adapted to confront each other and engage the peripheral border of the flexible diaphragm 20 to clamp the same therebetween in a gas tight manner. Such diaphragm is made of any flexible, impervious material capable of withstanding the action of the fluids to which it is subjected and is usually sufficiently compressible to be self-gasketing when clamped between the flat borders of the housing.

From the standpoint of economy only a limited number of clamping bolts 21 are passed through aligned apertures in the borders 17 and 18, as seen in Fig. 2, and the spacing of these is such that the large unsupported border areas such as 22 between them are of insufficient rigidity, because of the thinness of the metal, to insure a gas tight fit. To overcome this difficulty and to provide several other important features of the invention, each of the borders 17 and 18 is fitted with a cylindrical flange. That shown at 23 and fitted integrally to the peripheral edge of border 17 extends toward the other shell part, while that numbered 24 and formed integral with the slightly smaller periphery of the border 18 projects backwardly and loosely telescopes within 23 as shown.

This telescoping aligns the two parts when they are brought together and simplifies the threading of the bolts through the complementary holes in the borders. Furthermore, the diaphragm is cut to the exact diameter of the inside of the outer flange 23 and is accurately centered thereby. Moreover this flange 23 extends well over the diaphragm outer edge, which is thus completely shielded and protected from the weather. This is of considerable importance where the use is out doors, as for instance, in gas service-pressure regulators. Certain materials used in the diaphragms are seriously affected by continuous and direct exposure to air, moisture and sunlight.

The cylindrical flanges 23, 24 materially stiffen the respective borders so that intermediate areas 22 are insured against sufficient deflection to permit the leakage of fluid from either shell half, between it and the diaphragm.

Preferably the two shell parts are connected together by machine screws, and for this purpose the holes through which the screws pass are spaced from the inner cylindrical flange 24 a distance just slightly greater than the center-to-"flat" spacing of one of the nuts 25 cooperating with the machine screws. These nuts are non-circular and preferably hexagonal in cross-section so that one "flat" 26 may cooperate with the flange 24 as shown to prevent rotation of the nut when the machine screw is being tightened. This eliminates the need for the use of a wrench by the mechanic assembling the diaphragm housing.

What is usually termed the back face of the diaphragm is subjected to spring pressure opposing the higher pressure in the front housing half 11, and this pressure is preferably from a helical spring 30 of considerable length and diameter to give the desired action. This spring is required to be cased and supported, and for this purpose a spring tube 31 is provided, disposed axially of the shell 10. Its length is too great to be drawn integral with the shell half 10 and the requirements for it to be internally threaded, as shown at 32, for holding the closure cap 33 as well as any interior, spring-adjusting plugs necessitates metal of a heavier gauge than that of the diaphragm housing. This heavier gauge tube wall 34 is step-cut away on its outer periphery at the end secured to the housing so as to telescope within the short integral sput 35 pressed from the metal of the housing. The arrangement is such that the shoulder 36 at the junction of the two different external diameters of the tube 31 abuts the end of this sput as shown, while the thinner wall portion 37 of the tube closely telescopes inside of the sput. Its inner end 38 is flared outwardly by a rolling operation between the fillet or radius 39 at the junction of the sput and the central portion of the shell half 10. To provide further rigidity a series of spot welds 40 are made about the telescoping peripheries of the two parts.

The diaphragm shell constructed as just described is extremely light in weight and because of the shape of the parts is of adequate rigidity for all low pressure uses. There is almost no machine work involved and the costs are extremely low.

I claim:

In combination a flexible diaphragm subject to fluid pressure on one side and to resistant spring pressure on the other, a case for said diaphragm comprising complementary case parts formed of relatively thin sheet metal stampings dished to provide clearance for diaphragm movement between them and the said parts having narrow borders confronting each other, bolts passing through holes in said borders and the diaphragm and receiving nuts to clamp the borders tightly against the periphery of the diaphragm, one of said borders having a flange centering the diaphragm and the other part, the border of said other part having a tubular flange telescoping with the first, said flanges providing stiffness for said borders to reduce deflection thereof between bolts and one of said parts having an axially disposed tube for enclosing a spring in said tube biasing said diaphragm, said tube being of thicker metal than its case part and provided with threads, tube closure means engaging said threads, said case part having a short integral sput of the same outer diameter as that of the tube, the inner end of the tube being reduced in outer diameter to telescope into the sput, a shoulder at the junction of the reduced portion with the remainder of the tube abutting the end of the sput and the reduced portion extending through the sput and flared into the fillet at the junction of the sput and case part.

References Cited in the file of this patent

UNITED STATES PATENTS

| | | |
|---|---|---|
| 382,610 | Holmes | May 8, 1888 |
| 634,275 | Schenck | Oct. 3, 1899 |
| 892,788 | Wilkins | July 7, 1908 |
| 1,687,343 | Madden | Oct. 9, 1928 |
| 1,814,415 | Smith | July 14, 1931 |
| 1,947,196 | Frank | Feb. 13, 1934 |
| 1,973,717 | Kessenich | Sept. 18, 1934 |
| 2,047,633 | Jacobus | July 14, 1936 |
| 2,061,269 | Coakley | Nov. 17, 1936 |
| 2,067,945 | Peters | Jan. 19, 1937 |
| 2,241,056 | Chilton | May 6, 1941 |
| 2,306,768 | Wile | Dec. 29, 1942 |
| 2,381,178 | Munyon | Aug. 7, 1945 |
| 2,551,484 | Branning | May 1, 1951 |

FOREIGN PATENTS

| | | |
|---|---|---|
| 150,102 | Great Britain | Sept. 2, 1920 |